United States Patent [19]

Kelbe

[11] Patent Number: 5,005,031

[45] Date of Patent: Apr. 2, 1991

[54] CAMERA APPARATUS FOR MAGNETICALLY RECORDING ON FILM

[75] Inventor: Richard R. Kelbe, Fishers, N.Y.

[73] Assignee: Eastman Kodak Company, Rochester, N.Y.

[21] Appl. No.: 541,434

[22] Filed: Jun. 25, 1990

Related U.S. Application Data

[63] Continuation of Ser. No. 254,914, Oct. 7, 1988, abandoned.

[51] Int. Cl.$^5$ .............................................. G03B 17/24
[52] U.S. Cl. ...................................... 354/106; 354/76; 360/1
[58] Field of Search ................... 354/75, 76, 105, 106, 354/109; 352/92, 236; 360/1, 2, 3, 122, 104, 105, 109; 358/909

[56] References Cited

U.S. PATENT DOCUMENTS

| | | | |
|---|---|---|---|
| 4,270,853 | 6/1981 | Hatada et al. | 354/76 |
| 4,270,854 | 6/1981 | Stemme et al. | 354/76 |
| 4,500,183 | 2/1985 | Tanikawa | 354/21 |
| 4,613,911 | 9/1986 | Ohta | 360/3 |
| 4,642,717 | 2/1987 | Matsuda et al. | 360/105 |
| 4,689,696 | 8/1987 | Plummer | 358/333 |
| 4,736,215 | 4/1988 | Hudspeth et al. | 354/21 |
| 4,829,384 | 5/1989 | Iida et al. | 354/76 |
| 4,843,414 | 6/1989 | Yoshina | 354/21 |
| 4,860,037 | 8/1989 | Harvey | 354/105 |
| 4,864,332 | 9/1989 | Harvey | 354/105 X |
| 4,888,657 | 12/1989 | Lacey | 360/122 |

*Primary Examiner*—A. A. Mathews
*Attorney, Agent, or Firm*—Roger A. Fields

[57] ABSTRACT

Magnetic recording apparatus for photographic still camera comprises a magnetic head mounted on a film platen to contact a magnetic coating on the film. A pressure pad on the opposite side of the film urges the film into contact with the head. The head is inclined transversely of the film to conform to the transverse film curl and is provided with angled surfaces to provide for better wrap of the film around the head and easier threading.

6 Claims, 5 Drawing Sheets

CAMERA APPARATUS FOR MAGNETICALLY RECORDING ON FILM

This is a Continuation of application Ser. No. 07/254,914, filed Oct. 7, 1988, abandoned.

CROSS REFERENCE TO RELATED APPLICATIONS

Reference is made to the following commonly assigned copending applications:

1. U.S. Ser. No. 254,906, entitled CAMERA APPARATUS FOR MAGNETICALLY RECORDING ON FILM, and filed Oct. 7, 1988 in the names of Michael L. Wash and Conrad Diehl.
2. U.S. Ser. No. 254,903, entitled CAMERA APPARATUS FOR MAGNETICALLY RECORDING ON FILM, and filed Oct. 7, 1988 in the names of Michael L. Wash and Christopher T. Mattson, now U.S. Pat. No. 4,933,786.
3. U.S. Ser. No. 254,908, entitled CAMERA APPARATUS FOR MAGNETICALLY RECORDING ON FILM, and filed Oct. 7, 1988 in the names of Daniel M. Pagano and Robert P. Cloutier.
4. U.S. Ser. No. 255,693, entitled FILM INFORMATION EXCHANGE SYSTEM USING DEDICATED MAGNETIC TRACKS ON FILM and filed Oct. 7, 1988 in the name of Robert P. Cloutier et al.
5. U.S. Ser. No. 221,955, entitled MOTOR-DRIVEN FILM TRANSPORT APPARATUS, and filed July 20, 1988 in the name of Donald M. Harvey, now U.S. Pat. No. 4,855,773 . U.S. Ser. No. 221,955 is incorporated into this application by reference.
6. U.S. Ser. No. 206,407, entitled, as amended, THREE PART DECODER CIRCUIT, and filed June 14, 1988 in the name of Michael L. Wash.
7. U.S. Ser. No. 206,408, entitled, as amended, THREE PART ENCODER CIRCUIT, and filed June 14, 1988 in the names of Arthur Whitfield and Michael L. Wash, now U.S. Pat. No. 4,912,467.
8. U.S. Ser. No. 206,553, entitled, as amended, THREE PART DECODER CIRCUIT, and filed June 14, 1988 in the name of Arthur Whitfield, now U.S. Pat. No. 4,876,697. 9. U.S. Ser. No. 206,646, entitled METHOD FOR MODULATING A BINARY DATA STREAM, and filed June 14, 1988 in the name of Michael L. Wash.
10. U.S. Ser. No. 254,907, entitled CAMERA APPARATUS FOR PREVENTING DOUBLE EXPOSURE and filed Oct. 7, 1988 in the name of James W. Cannon, now U.S. Pat. No. 4,878,075.

BACKGROUND OF THE INVENTION

This invention relates to magnetic recording apparatus for cameras and more particularly, to magnetic recording apparatus for photographic still cameras.

In commonly assigned copending application Ser. No. 255,693 entitled FILM INFORMATION EXCHANGE SYSTEM USING DEDICATED MAGNETIC TRACKS ON FILM, and filed Oct. 7, 1988 in the name of Robert P. Cloutier there is disclosed a photographic film having a virtually transparent magnetic coating covering the non-emulsion side of the film and dedicated recording areas on the coating for recording information such as film type, film speed, film exposure information and information relevant to the processing and subsequent use (e.g. printing) of the film. The system thus provides for recording of information during film manufacture, reading and/or recording of information during camera use, and reading and/or recording of printed related information during photofinishing. In the aforementioned copending application it is specifically proposed that camera information be recorded in spaced tracks preferably outside the image area along the edge of the film.

Reading and writing information on a magnetic coating or stripe on photographic film in a still camera requires solutions to problems different than those encountered in other apparatus. Perhaps the most significant problem is the space limitations in a portable hand held still camera which necessarily must be as compact and light as possible to appeal to the average consumer. Perhaps equally significant, however, is the characteristics of photographic film relative to more common recording mediums such as magnetic tape. Because photographic films are stiffer than magnetic tape and have varying degrees of curl both in the longitudinal and transverse directions depending upon the base materials and number and nature of sensitizing layers and environmental conditions, they present unusual problems in reading and writing information on a magnetic coating or stripe. To provide a reliable read or write signal the magnetic head must remain in close proximity to the magnetic coating. Any disturbances such as variations in film curl can vary the relationship of the head to the coating and decrease the reliability of the signal.

Another problem unique to compact photographic still cameras is that film advance occurs in a short period of time with a limited amount of motion and does not allow the steady state conditions normally associated with magnetic recording. Recording and playback must take place during transient conditions which tend to separate the film from the recording head. For optimum magnetic recording during these conditions, the magnetic head must maintain contact (i.e. within 10 micro-inches) with the magnetic coating.

Techniques for maintaining the desired relationship of the head to a magnetic coating in other apparatus, are not practical for use in a photographic still camera particularly a compact 35 mm camera. For example, in a sound movie camera, a film having a magnetic stripe along one edge is typically moved over a drum and information is recorded by a magnetic head positioned in close proximity to the drum. The drum provides a rigid support for the film, removes film curl and assures a uniform head to film relationship. While such a fixed support such as a sound drum produces satisfactory results, the space limitations in a photographic still camera render it impractical. Also, it is not suitable for the transient conditions described above.

Also, in a still camera system, it is desirable to record information pertinent to and coincident with images because negatives are cut up in photofinishing. In sound movie cameras, recorded information is displaced from the image to achieve continuous motion of the film during recording as compared with intermittent motion during exposure.

The prior art relating to recording on photographic films thus generally teaches providing a support for the recording medium on the side opposite from the recording head and continuous motion of the recording medium to ensure reliable recording.

Commonly assigned copending application Ser. No. 254,908 filed Oct. 7, 1988 in the names of Robert P. Cloutier and Daniel M. Pagano discloses magnetic recording applications for a photographic still camera wherein a magnetic recording head mounted in a fixed position in a film platen. A pressure pad on the other side of the film urges the film into contact with the head. To avoid distortion of the film by the pad pressure during exposure, the pressure pad is retracted during exposure of the film. While this approach achieves the desired recording reliability it requires special parts for retracting the pressure pad.

SUMMARY OF THE INVENTION

In accordance with a preferred embodiment of the invention, a photographic still camera is provided with a magnetic recording head which is mounted in a film platen. A complient pressure pad urges the film into contact with the head. To reduce the contact pressure of the film with the head, the head is inclined relative to the film plane so that it conforms in inclination to the film surface curl.

BRIEF DESCRIPTION OF THE DRAWINGS

Other advantages of the invention will become apparent from the following description taken in connection with the accompanying drawings wherein.

DETAILED DESCRIPTION OF THE INVENTION

Figure 1:
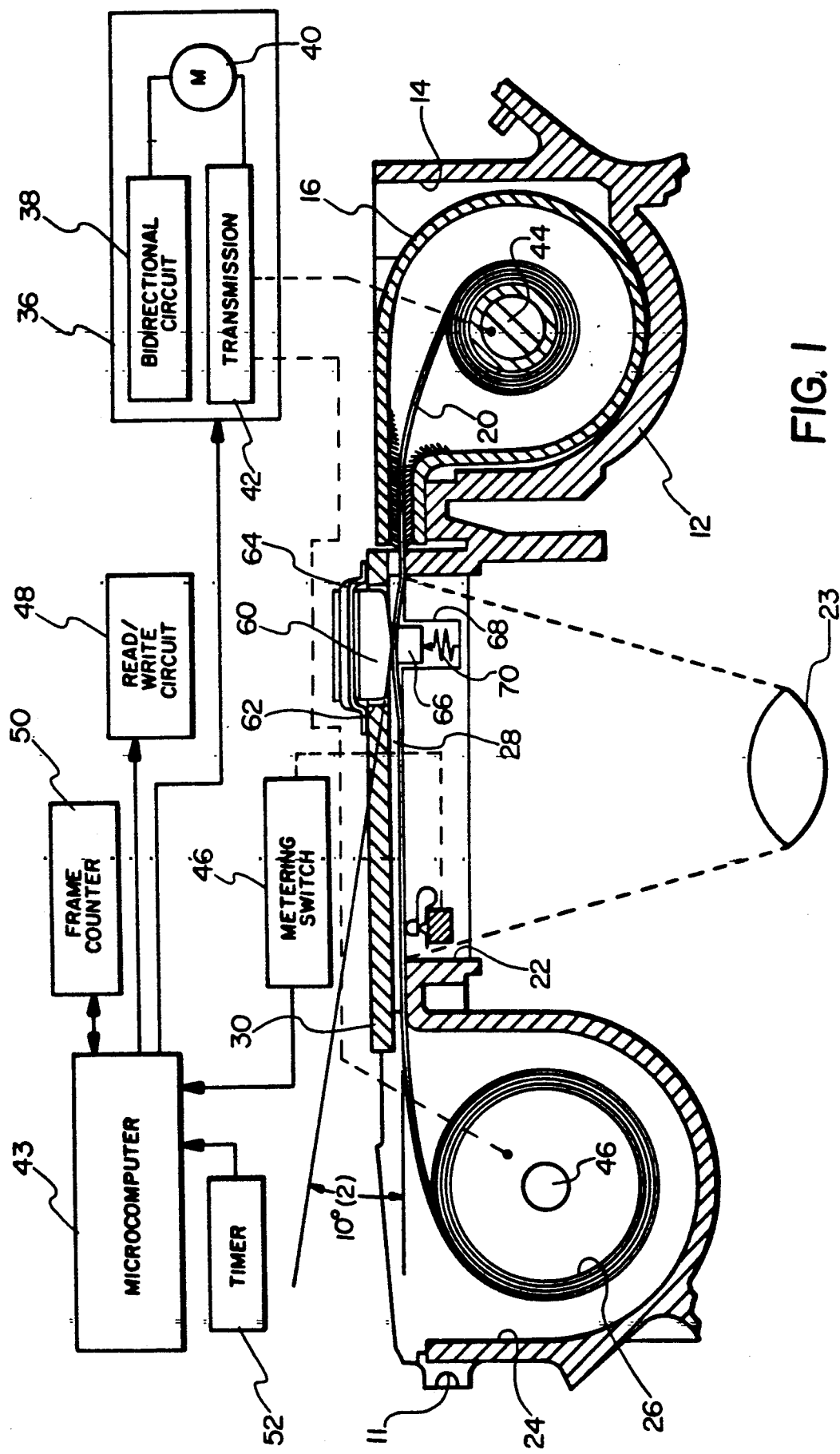
FIG. 1 is a cross section of a portion of a conventional photographic still camera illustrating a magnetic recording apparatus in accordance with the invention.
Figure 2:
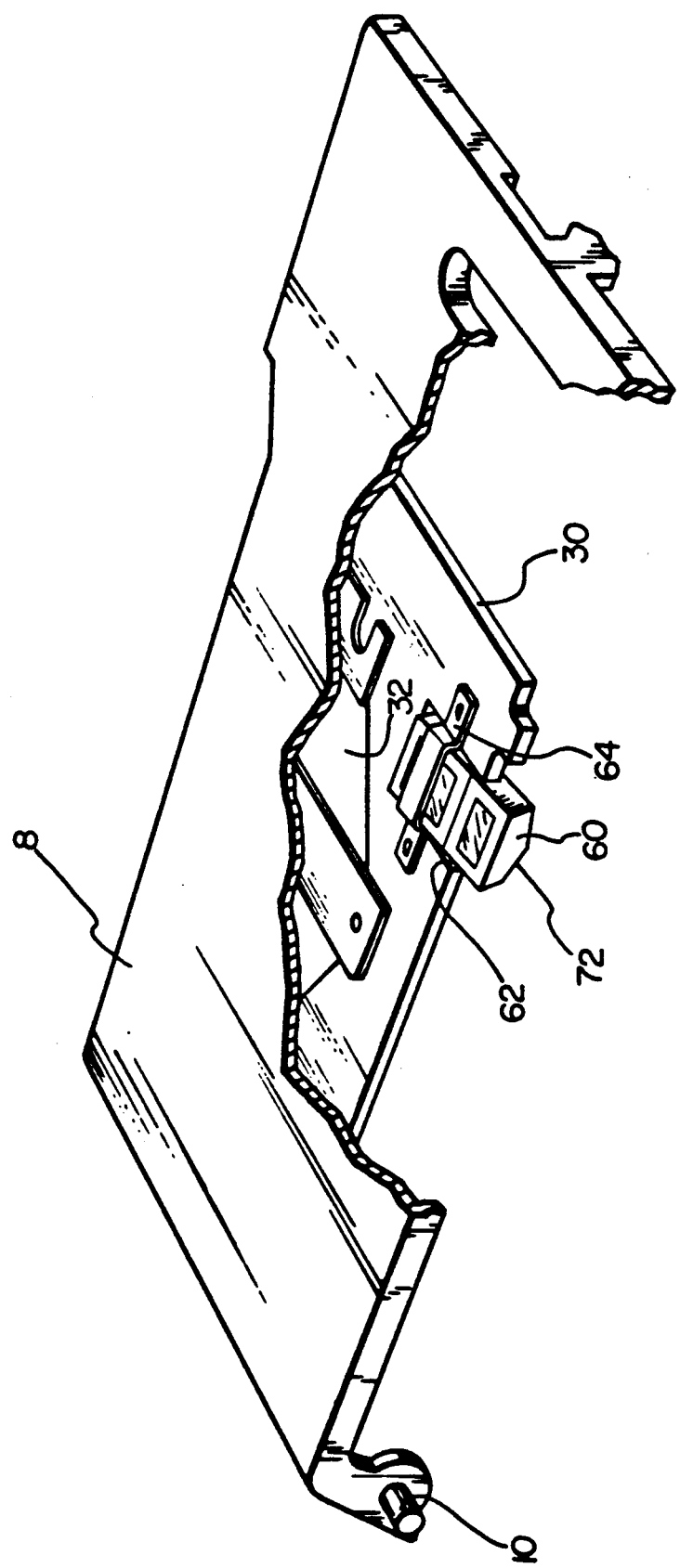
FIG. 2 is a perspective view of the back or door for the camera illustrated in FIG. 1.
Figure 3:
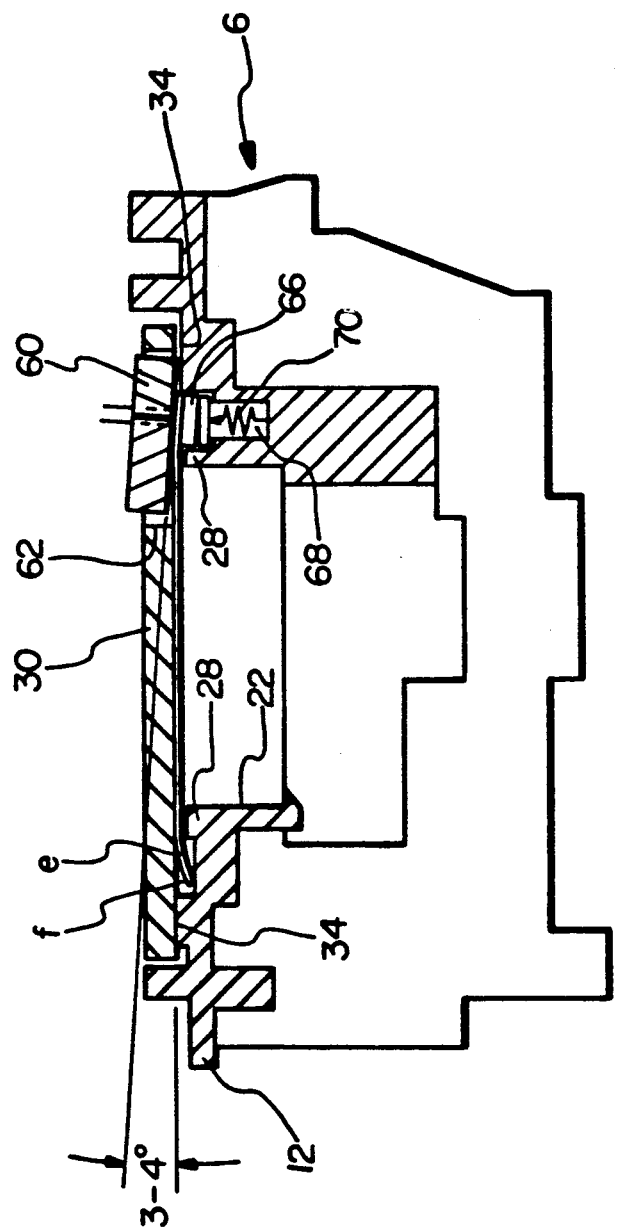
FIG. 3 is a cross section taken perpendicular to the section shown in FIG. 1.

Referring to FIGS. 1, 2 and 3 of the drawings, there is shown a portion of a typical photographic still camera 6 having a back or rear door 8 (FIG. 2) pivotal to an open position by means of a pair of pins 10 one of which is shown in FIG. 2. The pins 10 are received in holes 11 in frame 12. Since such cameras are well known in the art, features not necessary for an understanding of the present invention have been omitted or shown in block diagram to simplify the disclosure. Also, the invention will be described with reference to a single magnetic head. However, it is to be understood that a camera can be provided with a plurality of heads for multi-track recording.

The camera 6 comprises a frame or housing 12 having a chamber 14 at one end thereof for receiving a film cartridge 16. The cartridge 16 which is shown more clearly in FIG. 4, preferably takes the form of the film cartridge disclosed in the referenced copending application U.S. Ser. No. 221,955 having a lip 18 from which a film 20 is removed for exposure. The film 20 is provided with a transparent magnetic coating 21 on its non-emulsion side, a single row of perforations (p) along one edge and dedicated longitudinal recording areas (r) along the edges outside the image area (i). As disclosed in copending application Ser. No. 255,693, filed Oct. 7, 1988 in the name of Robert P. Cloutier and entitled FILM INFORMATION EXCHANGE SYSTEM USING DEDICATED MAGNETIC TRACKS ON FILM, the areas (n) would be dedicated areas for recording information in the camera, the image area being dedicated to the recording of photofinishing information.

It will be apparent, however, that the recording apparatus disclosed herein is equally applicable to magnetic coatings or stripes on conventional 35 mm film, and that the camera apparatus disclosed herein can alternatively be a conventional 35 mm camera such as the commercially available KODAK K-14 Medalist VR 35 camera.

Figure 4:
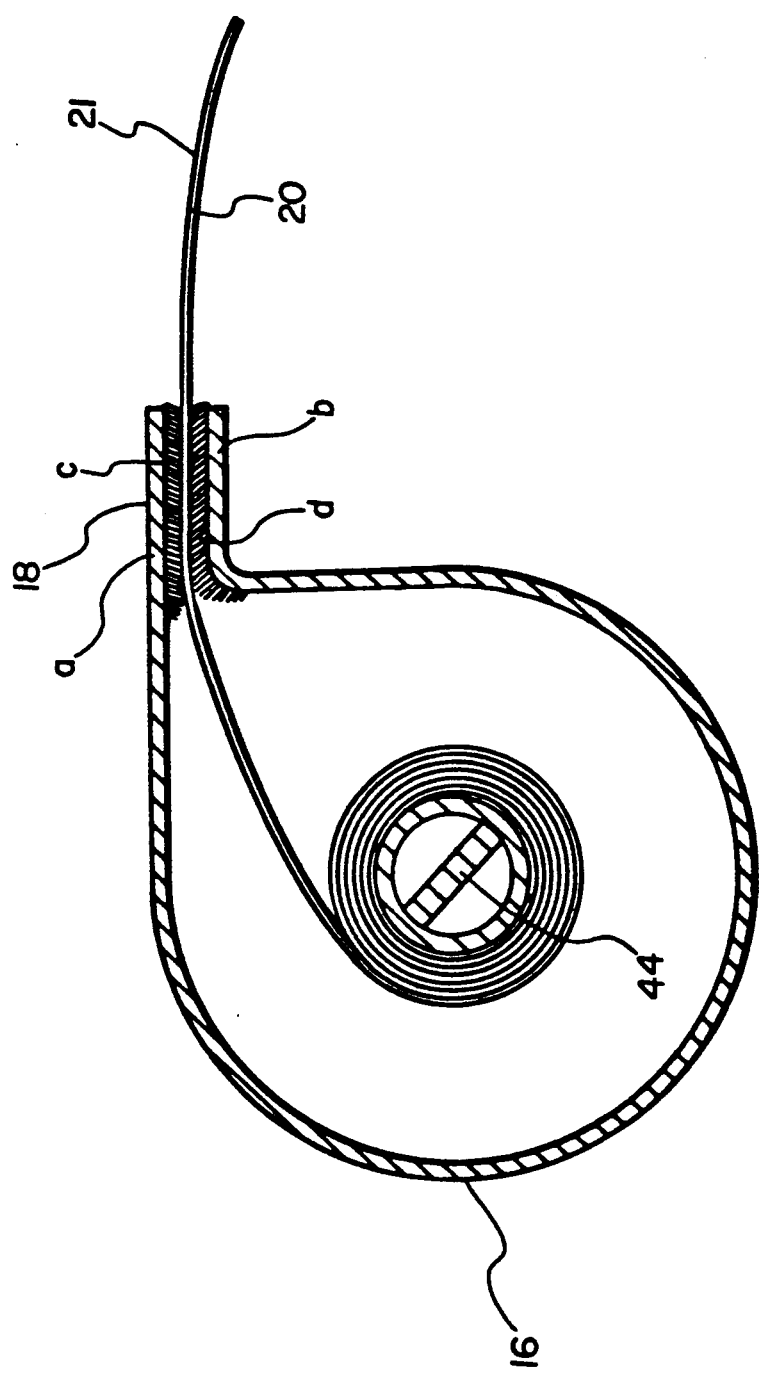
FIG. 4 is an enlarged cross section of the film cartridge shown in FIG. 1.
Figure 5:
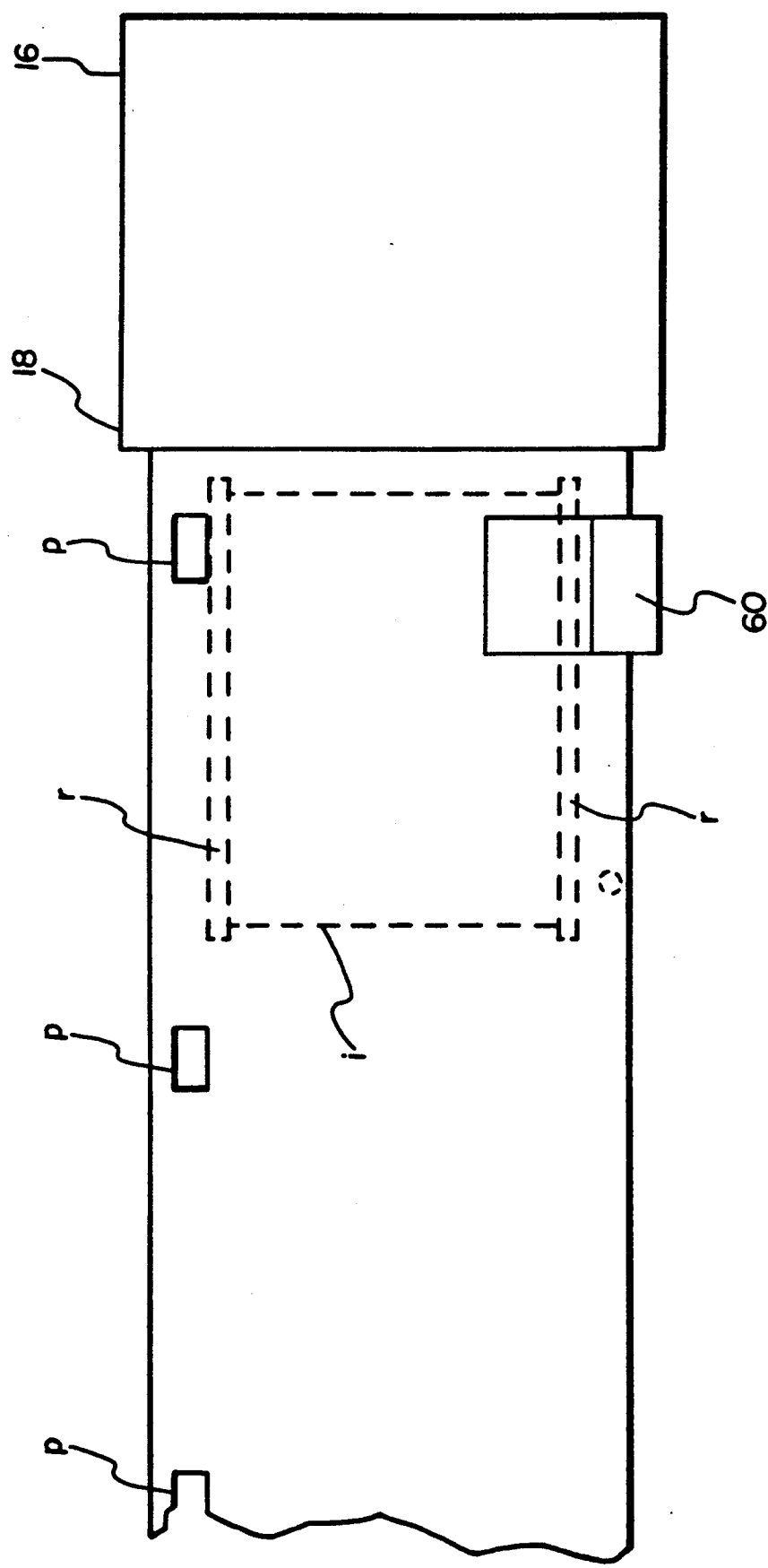
FIG. 5 is an enlarged top view of the film cartridge shown in FIG. 1 with the film partially withdrawn.

As shown in FIG. 4, the lip 18 comprises upper and lower spaced flanges (a) and (b) which serve to clamp upper and lower pieces of plush material (c) and (d) to opposite sides of the film.

As is well known in the art, the surfaces of cartridge 16 and lip 18 engage complimental surfaces of the chamber 14 and the camera back whereby when the camera back is closed, the cartridge is fixedly held in the orientation shown in FIG. 1. Since such camera and cartridge interface features are well known in the art, further description is deemed unnecessary.

From the lip 18, the film 20 is transported across a rectangular exposure opening 22 aligned with a taking lens 23 to a film take-up chamber 24 where it is wound on a take-up spool 26. Mechanisms for accomplishing such film transport are well known in the art. Typically, they operate to advance the film frame by frame from the cartridge to the take-up spool, or if the camera exposes during rewind, frame by frame from the take-up spool to the cartridge.

A pair of film rails 28 are formed on opposite sides of the rectangular exposure opening 22 to engage the longitudinal edges of the film. The film 20 is urged toward the rails 28 by a platen 30 mounted on a leaf spring 32 on the camera back 8. The platen 30 comprises a flat rectangular plate having planar dimensions complimental to the rectangular exposure opening 22 whereby upon closure of the back, platen 30 will engage platen support surfaces 34, engage the film 20 and urge it with slight pressure toward rails 28 under the influence of spring 32 as shown more clearly in FIG. 3. The platen 30 will tend to remove longitudinal curl resulting from film core set in the cartridge 16 and some of the transverse curl across the film. However, since the film is unsupported transversely on its emulsion side, some transverse curl still exists during film exposure as indicated in FIG. 3 at areas (e) but not enough to noticeably degrade the image.

In a typical still camera, the spacing between the platen 20 and the rails 28 is in the range of 0.25-0.45 mm as a result of manufacturing tolerances. The photographic film used in such a camera is typically 0.15 mm thick. Accordingly, as shown in FIG. 3, the film may not actually engage the rails. Due to the transverse film curl, the extreme edges of the film may actually engage the camera surfaces (f) on the other side of the rails with the curl bias causing most of the width of the film to engage the platen. Because of this result, the camera lens is typically focused on a film plane next to the platen.

FIG. 1 also depicts in a block diagram some of the more basic central features of cameras of the type described. Typically, a motorized film transport means 36 comprising a conventional bi-directional circuit 38 for reversing a drive motor 40, a drive transmission 42 and drive hubs 44 and 46 which engage the core of film cartridge 16 and the take-up spool 26 respectively, is provided for rotating the spool core and the take-up spool either in the unwinding or winding directions under the control of a micro computer 43.

Other elements of the camera include a conventional metering switch 46, a read/write circuit 48, a shutter release mechanism, a conventional digital frame counter 50 and a conventional timer 52. These components are all controlled from the micro computer 44 in a manner well known in the art and since they form no part of the present invention, further description is deemed unnecessary.

As mentioned above, magnetic recording in photographic still cameras involves unique problems. Film advance occurs in a short period of time with a limited amount of motion and does not allow the steady conditions normally associated with magnetic recording to be achieved. In view of these problems, the read/write circuit 48 preferably utilizes the encoding and decoding techniques disclosed in the referenced commonly assigned copending applications U.S. Ser. Nos. 206,407, 206,408 and 206,553, and the code format preferably takes the form of that disclosed in the referenced copending application Ser. No. 206,646.

In accordance with the invention, a conventional rectangular magnetic read/write head 60 connected to the read/write circuit 48 is mounted in an opening 62 of the platen 30. The head 60 is attached to a supporting bracket 64 which in turn is attached to the upper surfaces of the platen 30. A complient pressure pad 66 is mounted in a rectangular recess 68 of the camera body below the film 20 and in alignment with head 60. A spring 70 biases the pad 66 into engagement with the film and urges the film into contact with the head 60. The head 60 has a longitudinal axis perpendicular to the longitudinal axis of the film and a V-shaped bottom wall 72 having converging surfaces inclined at a 10 degree angle relative to the film surface. As shown in FIG. 3, the transverse axis of head 60 is inclined at a 3-4 degree angle relative to the film exposure plane.

The 3-4 degree inclination of the head 60 transversely of the film plane allows the head to follow the natural curvature of the film resting in the film gate. As will be obvious from FIG. 3, the film tends to bend downwardly along its edges because of transverse film curl and thus has edge region inclination. The 3-4 degree head inclination thus produces a more accurate head/film interface.

Because of the head inclination, less pressure is needed to achieve acceptable head/film contact. As a result, film surface wear and advance drag are reduced and film threading is easier. Perhaps most important, however, is that the head/film interface will have less effect on film flatness. In some cameras, such as 35 mm, non-single reflex camera, which has an objective lens with a fixed aperture size of F/8, acceptable film flatness can be achieved without retracting the pressure pad during exposure as disclosed in commonly assigned copending application Ser. No. 254,908, filed Oct. 7, 1988 in the names of Daniel M. Pagano and Robert P. Cloutier. This is because an inclined head approximating the film curvature can extend below the surface of the platen without being as severe of a discontinuity as a non-inclined head.

The 10 degree lead in angle of head 60 is also important. It allows for easier threading of the film leader as compared with a flat head surface that would present a butt edge to the film leader and the slight 10 degree angles allow for better wrap of the film around the head.

The disclosed recording apparatus thus offers a lower cost solution to magnetic recording in a photographic still camera and has advantages not heretofore achieved.

While the invention has been shown and described with reference to a preferred embodiment thereof, it will be apparent that various changes may be made without departing from the scope of the invention as defined by the appended claims.

I claim:

1. A photographic still camera for transporting a photographic film through an exposure position to expose frames of the film, the film having a magnetic surface for magnetically recording information on the film, said camera comprising:
    a camera body having an exposure opening;
    a film platen supported to engage the film and hold it in a exposure plane adjacent said opening; and
    a magnetic head mounted on said platen to engage one side of the film, said magnetic head being inclined transversely of the film to approximate the film inclination resulting from film curl.

2. A photographic camera as claimed in claim 1 further including:
    a pressure pad mounted on the other side of the film from said head in alignment with said head; and
    means for biasing said pressure pad into engagement with said film to urge the film into engagement with said head.

3. A photographic camera as claimed in claim 2 wherein said head is inclined approximately 3-4 degrees relative to the film plane.

4. A photographic camera as claimed in claim 1 wherein the surfaces of said head are inclined relative to longitudinal axis of the film to facilitate film threading.

5. A photographic camera as claimed in claim 4 wherein said head surfaces are inclined approximately 10 degrees relative to the longitudinal axis of the film.

6. A photographic still camera for transporting a photographic film along a predetermined path, the film having a magnetic surface for magnetically recording and/or reading information on the film, said camera comprising:
    a magnetic head; and
    means for supporting said magnetic head adjacent the predetermined path and inclined transversely of film in the predetermined path to approximate the film inclination resulting from transverse film curl.

* * * * *